Patented Aug. 12, 1924.

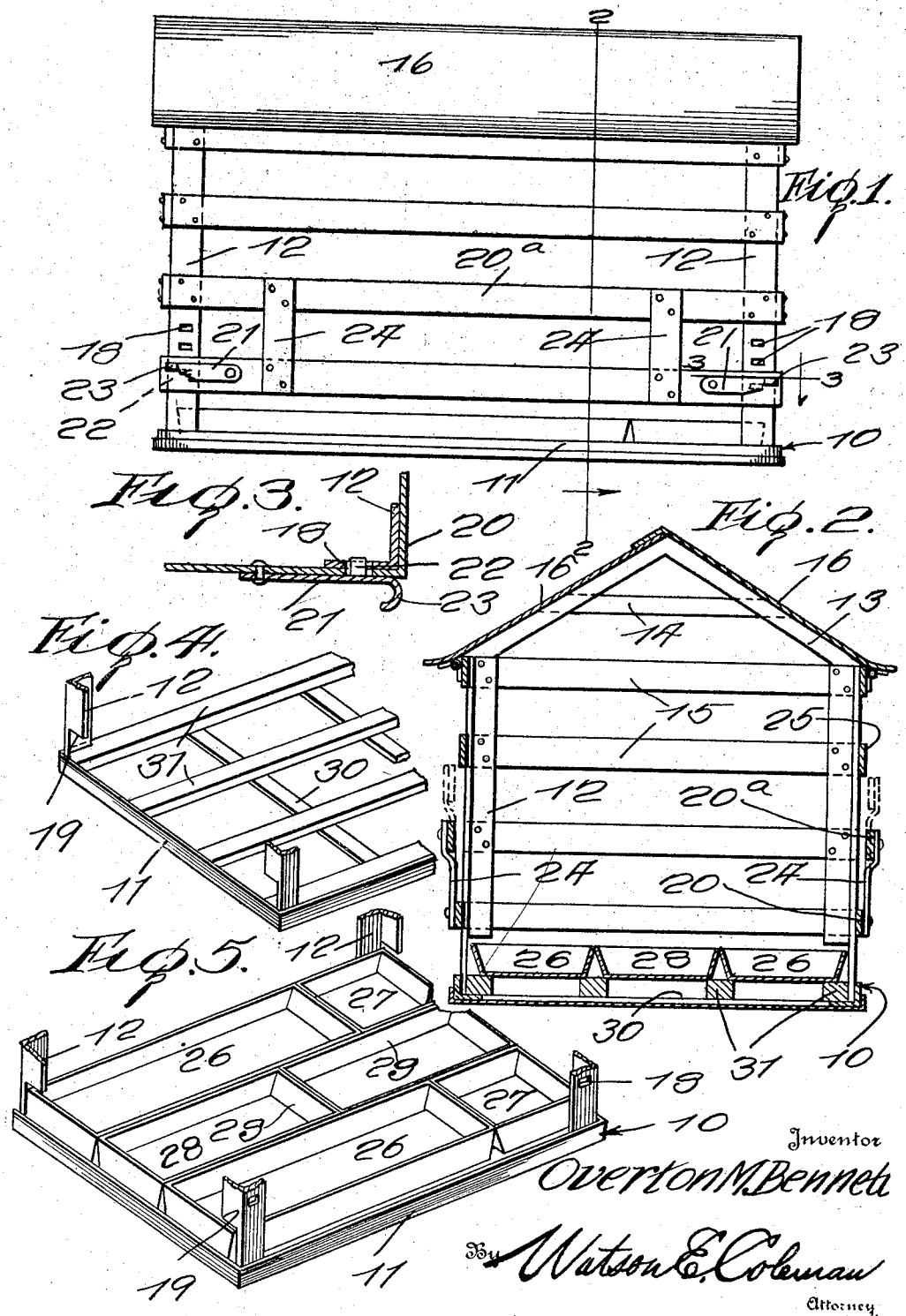

1,504,667

UNITED STATES PATENT OFFICE.

OVERTON M. BENNETT, OF LENOXVILLE, PENNSYLVANIA.

CHICKEN FEEDER.

Application filed September 15, 1923. Serial No. 662,882.

*To all whom it may concern:*

Be it known that I, OVERTON M. BENNETT, a citizen of the United States, residing at Lenoxville, in the county of Susquehanna and State of Pennsylvania, have invented certain new and useful Improvements in Chicken Feeders, of which the following is a specification, reference being had to the accompanying drawings.

This invention relates to chicken feeders, and particularly to certain improvements on the chicken feeder forming the subject-matter of Patent #1,417,226, granted on May 23, 1922.

In my original patent I showed a chicken feeder having a pan adapted to rest upon the floor and having partitions dividing it into compartments, this pan having four angle iron posts extending from it and supporting a roof and also supporting a series of longitudinal slats spaced from each other, the last slats of the series next above the pan being vertically adjustable so as to provide for feeding different sized chicks or other fowls.

One of the objects of the present invention is to improve upon the means whereby the lowermost slat is adjustable, and further to so construct the lowermost slats and the next above the lowermost slats with each lowermost slat that the slat just above may be raised simultaneously or lowered simultaneously, and to so mount these slats that an increased distance may be secured between the edge of the pans and the lowermost slat to thus enlarge the range of the feeding device.

A further object is to provide a device of this character in which the pans are supported upon a base and so supported that they may be readily slid outward when it is desired to refill the pans or to clean the feeder.

Another object is to so form the pans that the chickens in withdrawing their heads from over the pans will be likely to scrape off excess food and not carry this excess food onto the ground.

Other objects will appear in the course of the following description.

My invention is illustrated in the accompanying drawings, wherein:—

Figure 1 is an elevation of a feeder constructed in accordance with my invention;

Figure 2 is a vertical section on the line 2—2 of Figure 1;

Figure 3 is a section on the line 3—3 of Figure 1;

Figure 4 is a fragmentary perspective view of the base with the pans removed;

Figure 5 is a fragmentary perspective view of the base with the pans in place.

Referring to these drawings, 10 designates a base plate shown as rectangular in plan and having an upwardly extending rim 11, this rim being relatively narrow and extending entirely around the corners of the base. At the corners of the base 10 there are provided four upwardly extending posts 12 which are preferably made of galvanized metal and angular in cross section. Mounted upon the upper ends of these posts are the upwardly converging roof supporting members 13 connected by transverse end braces 14. Strips 15 connect the upper ends of the posts, and hinged to opposite strips 15 are the roof sections 16, one of the sections being so formed as to overlap the adjacent section and form the ridge of the roof. The posts 12 at a suitable distance above the upper edge of the rim 11 are formed with a plurality of narrow slits 18, and immediately above the rim 11 of the base one flange of each post 12 is cut away, as at 19. Supported upon these posts 12 immediately above the rim 11 are four thin metal strips 20 which may be connected together at their ends or not as desired but are preferably connected at their ends so as to define a rectangular figure extending entirely around the feeder, and these connected strips 20 are adapted to slip up and down upon the post 12.

For the purpose of holding these strips 20 in their adjusted position, the strips are provided with laterally extending spring latches 21, each spring latch at its free end being split to form a spur 22 and a finger hold 23. These spurs 22 are adapted to engage in the slits 18. Above these strips 20 are supported a plurality of strips 20ª. These preferably are arranged as illustrated in Figure 2, namely the strips 20ª are attached to the strips 20 by upright metal strips 24 which are riveted or otherwise attached to the strips 20 and at their upper ends are deflected so as to support the strips 24 outward of the plane of the outer strips 20. Above the strips 20ª are disposed the strips 25 which may be permanently attached to the post 12. Normally the strips 20 are disposed a certain distance above the rim 11 of the base 10 and the strips 20ᵃ are spaced a predetermined distance above the strips 20, while the strips 25 are spaced a like distance above the strips 20ᵃ. If, however, it be desired to lift the strips 20 their full height they may be shifted upward and in that case the strips 20ᵃ will overlie the strips 25, as illustrated in Figure 2. It will be understood that normally these strips 20, 20ᵃ, and 25 are disposed sufficiently near to each other as to prevent chickens passing between the strips and thus obtaining access to the pans.

Disposed within the base 10 and held in place by the rim 11 are a plurality of pans for containing water, feed, grit and the like. Any number of pans may be used. Preferably I use, however, the two relatively long and narrow pans 26 and dispose at the ends of these pans the two square pans 27, while disposed medially between the pans 26 and 27 are the two pans 28. These pans have upwardly extending rims and it is a point of my invention that these rims shall be turned inward or inwardly flanged, as at 29. Certain of the pans may be used for water and certain others for feed, and thus those pans which contain feed are designed to have the inwardly extending flange. Thus, for instance, the middle pans 28 may contain water and the pans 26 and 27 may contain feed and grit.

Preferably the base is reinforced by transversely extending rails 30 and by four longitudinally extending rails 31 upon which the pans are supported. These rails come up nearly to the level of the rim 11 so as to permit the pans to be readily withdrawn along the tracks formed by these strips.

It will be seen that the structure which I have devised is particularly effective for the purpose of feeding poultry, small chicks and the like. By adjusting the strips or slats 20 and 20ᵃ downward toward the rims of the pans, it is possible to prevent any but the smallest chicks from having access to the water, feed and grit within the pans, and by adjusting the strips 20 upward to permit chickens of a larger growth to have such access without permitting full-grown chickens to have the feed therefrom. Furthermore, by adjusting the slats or strips 20 so as to permit small chicks to insert their heads between the slats and the rim but prevent the bodies from passing, it is obvious that the chicks cannot get into the pan, become drowned in the water, or contaminate the contents of the pan and waste the food. Of course, the feed and water are prevented from contamination by leaves and dirt and the feed from being soaked or rendered unfit by rain because of the fact that the pans are entirely covered in. By attaching the strips 20ᵃ to the strips 20 and by disposing the strips 20ᵃ outward of the outer faces of the strips 25, it is possible to raise the strip 20 up to a maximum extent so as to permit relatively large chickens to have access to the food and water. It will be understood that if the strips 20 are independent of each other that the device might be placed in a poultry yard so divided by fencing that there shall be four runs on each side of the feeder and these four strips 20 could be adjusted to suit the chickens in these four runs so that the chickens in each particular yard or run may have access to the feed, grit and water without any chance of getting into the feeder.

I claim:—

1. A poultry feeding device comprising a base having a rim and adapted to contain food and water pans, posts extending upward from the corners of the base, slats or strips disposed above the rim of the base and carried by and vertically adjustable upon said posts, slats or strips disposed above the first named strips and supported thereon in a position outward of the plane of the outer face thereof, and slats or strips disposed in spaced relation to each other and carried above the first named strips and in secured positions upon said posts and extending outwardly of the last named strips and the roof.

2. A poultry feeder of the character described comprising a relatively shallow rectangular base having a rim and having longitudinal and transverse rails embracing the same and extending from end to end and side to side, metallic posts angular in cross section and attached to the corners of said rim and projecting upward therefrom, a roof supported on said posts, slats secured to and connecting the upper ends of the posts, said posts just above the wall of the base being formed with a vertical series of slits, slats disposed immediately above and in spaced relation to the rim of the base, latches carried upon said slats and engaging the slits in the posts whereby the slats may be raised or lowered relative to the rim of the base, upwardly extending arms secured to the outer faces of said slats, said arms being bent to cause their upper sections to extend outward of the planes of the outer faces of the slats, and slats secured to the upper sections of said arms in positions parallel and in spaced relation to the first mentioned slats and movable vertically therewith.

In testimony whereof I hereunto affix my signature.

OVERTON M. BENNETT.